Inventors,
Kenneth W. MacFadyen,
Edward F. Perlowski,
Thomas L. Sherer,
by Sidney Greenberg
Their Attorney.

Nov. 26, 1968   K. W. MacFADYEN ET AL   3,413,404
ELECTRICAL APPARATUS AND DIELECTRIC MATERIAL THEREFOR
Filed Feb. 16, 1965   3 Sheets-Sheet 2

Inventors,
Kenneth W. MacFadyen,
Edward F. Perlowski,
Thomas L. Sherer,
by Sidney Greenberg
Their Attorney.

Inventors,
Kenneth W. MacFadyen,
Edward F. Perlowski,
Thomas L. Sherer,
by Sidney Greenberg
Their Attorney.

United States Patent Office 3,413,404
Patented Nov. 26, 1968

3,413,404
ELECTRICAL APPARATUS AND DIELECTRIC MATERIAL THEREFOR
Kenneth W. MacFadyen, Lenox, Mass., Edward F. Perlowski, Syracuse, N.Y., and Thomas L. Sherer, Richmond, Mass., assignors to General Electric Company, a corporation of New York
Filed Feb. 16, 1965, Ser. No. 433,105
20 Claims. (Cl. 174—17)

ABSTRACT OF THE DISCLOSURE

The thermal stability of cellulosic insulation in electrical apparatus, such as transformers, is improved by adding to the dielectric liquid of the apparatus a moisture removing compound composed of an organic compound of ethereal type having two to four ether groups and characterized by at least two ether groups linked to a common carbon atom.

---

Figure 1:
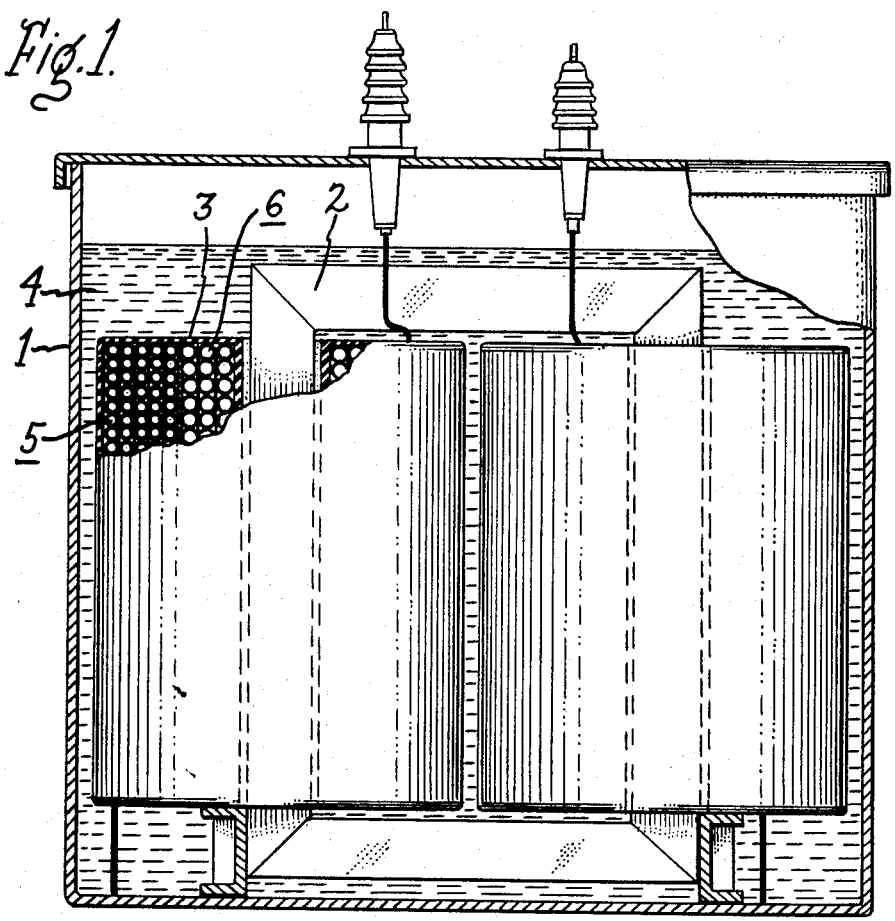

The present invention relates to electrical apparatus, and more particularly to dielectric material which imparts improved operating and life characteristics to electrical apparatus, especially of sealed types.

Dielectric liquids such as mineral oil and halogenated aromatic compounds have been extensively used in electrical apparatus such as transformers, power cables, high voltage bushings, capacitors, switches, and the like. Such apparatus also frequently incorporate electrical insulation including cellulosic material in the form, for example, of kraft paper, manila paper or chemically modified cellulosic papers used as turn insulation, layer insulation, and the like.

It is well recognized in the electrical insulating art that moisture in insulating liquids of electrical apparatus tends to degrade the electrical strength. In view of this, various devices and materials have been employed heretofore for the purpose of drying the insulating liquid before it is introduced into the electrical apparatus, e.g., transformers. It has been found, however, that the presence of moisture in the insulating liquid or elsewhere in the apparatus adversely affects, in a different manner, the operating life of electrical apparatus. Specifically, it appears that cellulosic insulation present in the apparatus, such as the paper wrappings and spacers associated with the electrical coil windings of a transformer, may deteriorate not only in its electrical properties but also in its physical characteristics due to the presence of moisture. Moisture serves to accelerate chemical changes especially at elevated temperatures, leading to the degradation of cellulosic insulation and thus adversely affects the thermal stability of the insulating material. Moreover, it has been found that the process of thermal degradation in itself leads to the evolution of additional water which further contributes to the deterioration of the cellulose.

While, as indicated above, methods for pre-drying the insulating liquid have been utilized heretofore, such methods are not adapted or satisfactory to be used for in situ removal of moisture therein continuously during operation of the apparatus, principally because of the characteristics of the known moisture adsorbent materials. Certain adsorbents, for example, activated alumina, are undesirable for this purpose because of their tendency to react with the insulating liquid constituents to form deleterious products, e.g., sluge or acids. In other cases, dehydrating material such as fuller's earth are of unsatisfactory physical form to be immersed in the dielectric liquid for effective in situ drying of the liquid. Moreover, many of the known drying agents remove scavenger compounds and other additives which are often incorporated in dielectric liquids to improve their properties or remove undesirable products therefrom.

It is an object of the invention to improve the thermal stability of cellulosic insulation in electrical apparatus while avoiding the above disadvantages of the prior art.

It is another object of the invention to provide hermetically sealed electrical apparatus having cellulosic insulation and dielectric fluid therein wherein means are incorporated in the apparatus for in situ removal of moisture present in the dielectric fluid and evolved from the cellulosic insulation during operation of the apparatus, in order to improve the aging characteristics of the cellulosic insulation, especially its thermal stability under operating conditions.

It is still another object of the invention to provide an improved dielectric fluid material which imparts improved operating and life characteristics to electrical apparatus, especially of the sealed type.

Other objects and advantages will become apparent from the following description and the appended claims.

To attain the above objects, there is provided in accordance with a preferred embodiment of the invention an electrical apparatus comprising, in combination, a container, an electrical device in the container which develops heat during operation of the apparatus, cellulosic electrical insulating material such as kraft or manila paper associated with the electrical device, the cellulosic material being subject to deterioration in the presence of moisture under the temperatures developed and evolving moisture in the process of deterioration, fluid insulating means in the container for insulating the electrical device and to dissipate heat developed therein, the fluid-insulating means containing therein an organic compound of ethereal type having two to four ether groups and characterized by at least two ether groups linked to a common carbon atom, as more fully described hereinafter.

Figure 2:
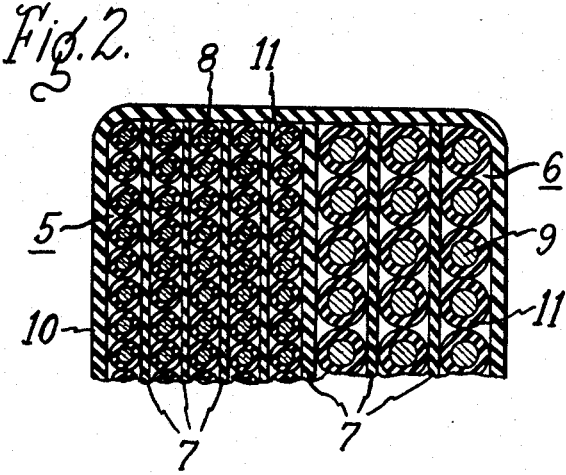
Figure 3:
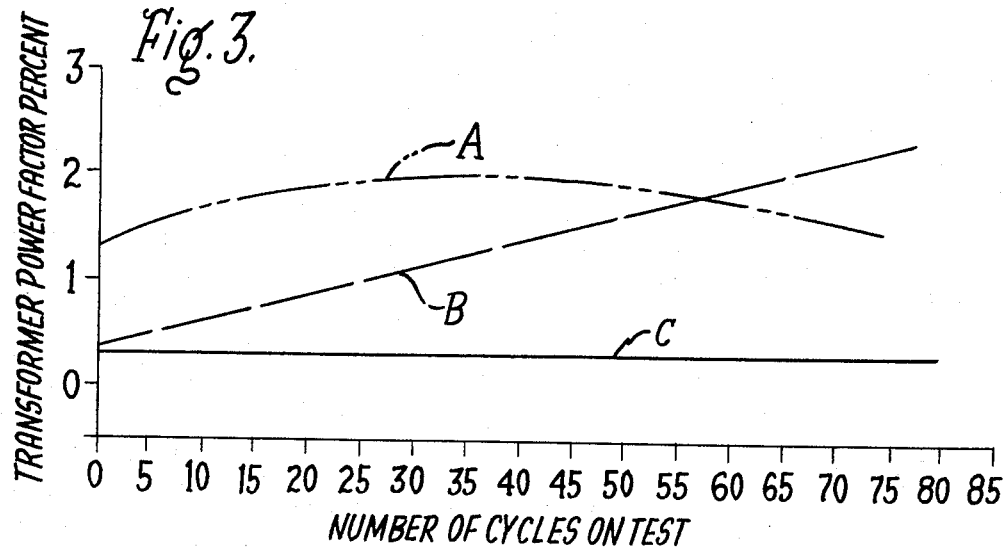
Figure 4:
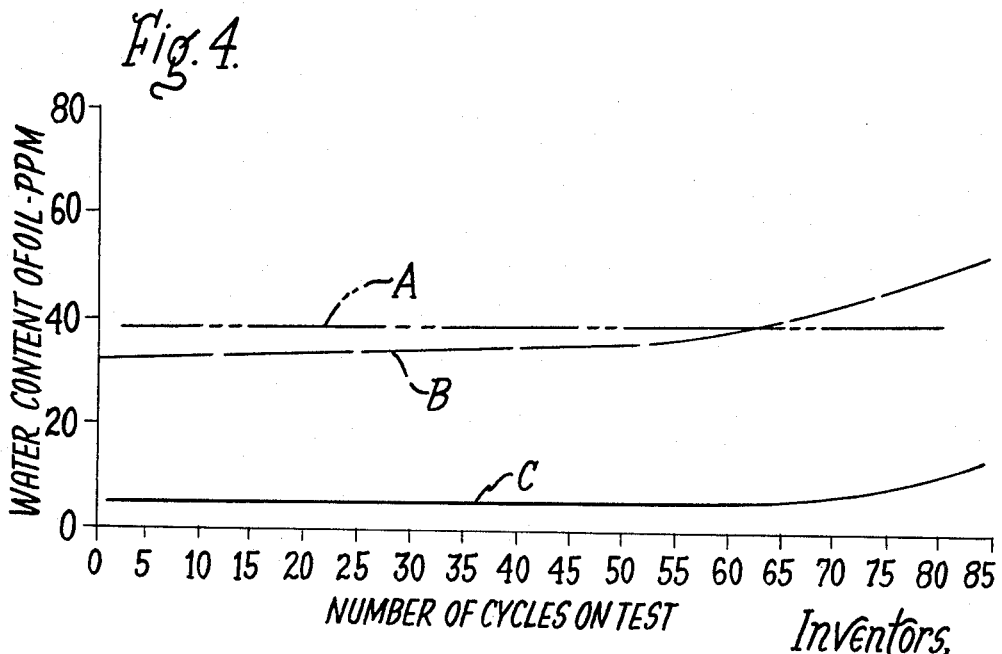
Figure 5:
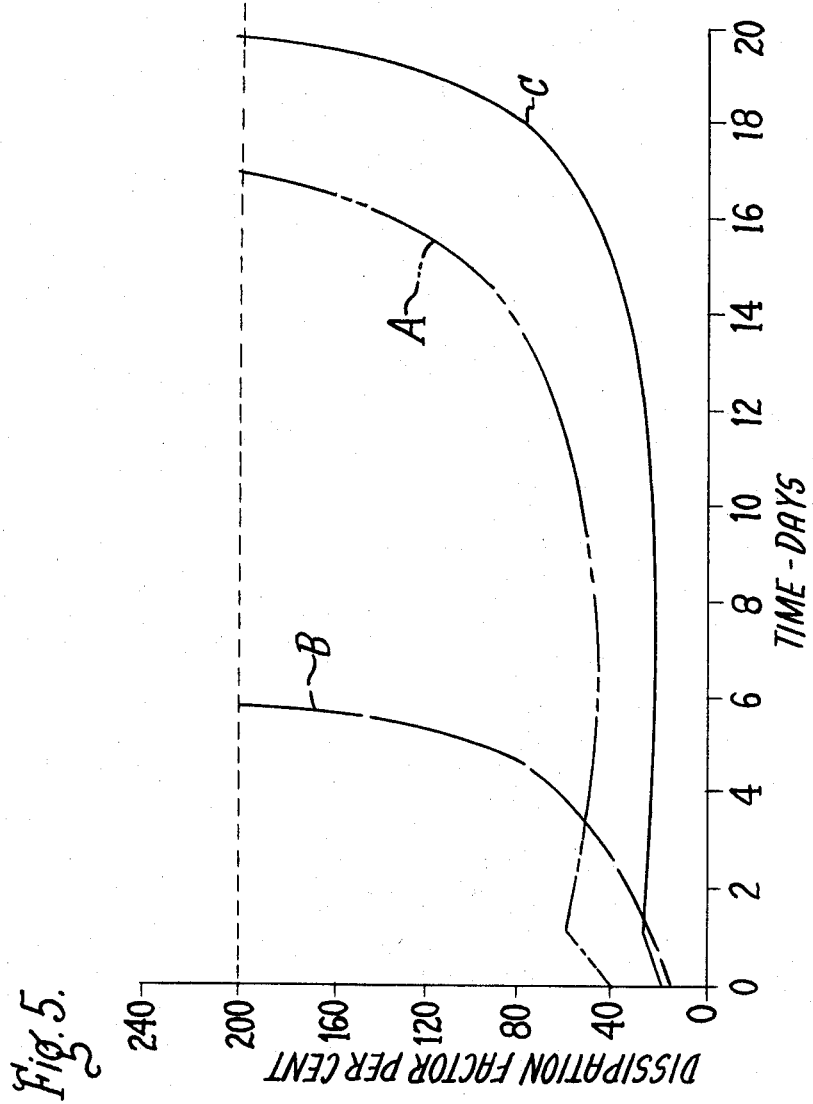

The invention will be better understood from the following description taken in conjunction with the accompanying drawings, in which:

FIGURE 1 is a view of a transformer, partly broken away, in which the invention may be embodied;
FIGURE 2 is an enlarged fragmentary view in section of a portion of the transformer of FIGURE 1; and
FIGURES 3, 4 and 5 are graphs showing the improvement afforded by the present invention in terms of electrical and dehydrating properties and life characteristics.

Referring now to the drawings, and particularly to FIGURE 1, there is shown a transformer comprising a hermetically sealed tank 1 enclosing a magnetic core 2 and coil 3 and being partially filled with a suitable dielectric liquid 4 in which the core and coil assembly is immersed. Coil 3, as shown more clearly in FIGURE 2, comprises high voltage winding 5 and low voltage winding 6, the windings having cellulosic insulating sheets 7, such as kraft or manila paper, between layers of the wound conductors 8 and 9, the coil also having an exterior cellulosic wrapping 10 such as heavy kraft or manila paper. Conductors 8 and 9 are provided with a suitable insulating enamel coating 11 such as the phenolic modified polyvinyl formal described in Jackson et al. Patent No. 2,307,588.

In accordance with the invention, dielectric liquid 4, which may be composed of conventional dielectric liquid such as mineral oil, chlorinated diphenyl or other suitable insulating fluid, contains a dehydrating material comprising one or more compounds having the following generic formula:

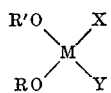

where M is a member selected from the group consisting of C, and $CH(CH_2)_mCH$ wherein $m$ is a number from 0–14 inclusive, and in addition Ti and Si; R and R' are members selected from the group consisting of $C_nH_{2n+1}$ and aryl substituted derivatives thereof wherein $n$ is a number from 1–15 inclusive, and $—(CH_2)_n—$ forming a divalent cyclic structure connecting R and R' and wherein $n$ is a number from 2–4 inclusive; and X and Y are members selected from the group consisting of H, alkyl, aryl, OR, and OR', where R and R' are as defined above.

A significant feature of the compounds included here is that of two or more oxygen functions being bonded to the same carbon atom.

It has been found that compounds included within the general class shown above are typically characterized by good moisture removing properties when incorporated in dielectric liquids such as mineral oil and askarels, e.g., those including chlorinated diphenyl and chlorinated benzene, and serve to substantially thermally upgrade sealed electrical apparatus, and especially electrical apparatus employing cellulosic insulation.

Examples of compounds of the above formula which may be employed for purposes of the invention are as follows:

(1) Trimethoxymethane (methyl orthoformate)

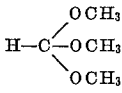

(2) Triethoxymethane (ethyl orthoformate)

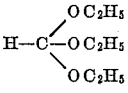

(3) Tri-n-butoxymethane (n-butyl orthoformate)

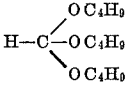

(4) Tri-n-pentoxymethane (n-amyl orthoformate)

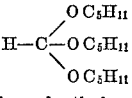

(5) Tribenzyloxymethane (benzyl orthoformate)

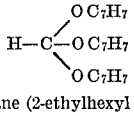

(6) Tri-2-ethylhexoxymethane (2-ethylhexyl orthoformate)

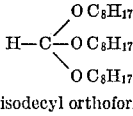

(7) Tri-isodecoxymethane (isodecyl orthoformate)

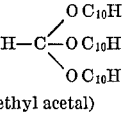

(8) Dimethoxymethane (methyl acetal)

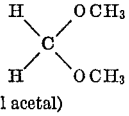

(9) Diethoxymethane (ethyl acetal)

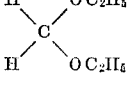

(10) 1,1-dimethoxyethane

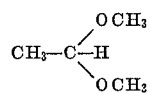

(11) Tetramethoxymethane (methyl orthocarbonate)

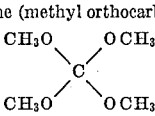

(12) Trimethoxyethane (methyl orthoacetate)

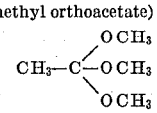

(13) Triethoxyethane (ethyl orthoacetate)

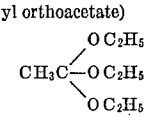

(14) 2,2-dimethoxypropane

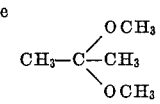

(15) 2,2-diethoxypropane

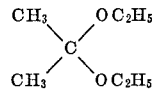

(16) 1,1,3-trimethoxy-3-ethoxypropane

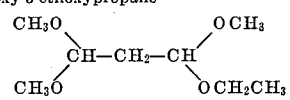

(17) 1,1,3,3-tetraethoxypropane

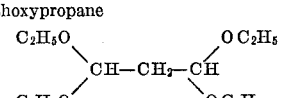

(18) 2,2-di-n-butoxypropane

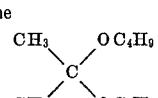

(19) 2-methoxy-2-butoxypropane (Acetone-n-butylmethyl acetal)

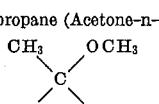

(20) 1,1,1-trimethoxypropane (Methyl orthopropionate)

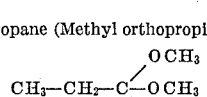

(21) 1,1,1-triethoxypropane (Ethyl orthopropionate)

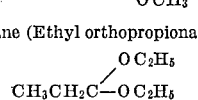

(22) 1,1,1-trimethoxy-n-pentane (methyl ortho n-valerate)

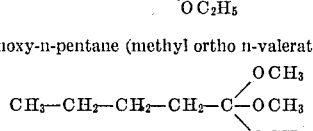

(23) Tetrabutyl titanate

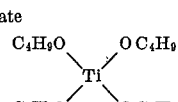

(24) Diethylene acetal of malonaldehyde

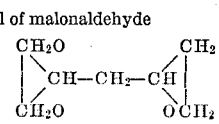

(25) Triethoxysilane

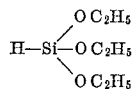

(26) Tetraethoxysilane (ethyl orthosilicate)

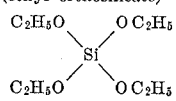

(27) Tetramethoxysilane (methyl orthosilicate)

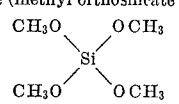

Of the foregoing compounds, the alkyl orthoformates have proved especially satisfactory, and in particular, the higher molecular weight orthoformates, namely, 2-ethylhexyl orthoformate and isodecyl orthoformate have been found to be of eminently practical use in sealed transformers having cellulosic insulation components. In a more limited aspect of the invention, therefore, the compounds which may be employed as stabilizing agents in dielectric fluid of electrical apparatus are defined by the formula:

where R, R' and R" represent straight or branched chain alkyl groups having one to twelve carbon atoms.

The manner in which the drying additives of the invention function to thermally uprate cellulosic insulation materials appears to be two-fold: (1) by reacting with moisture originally present in the cellulose and that formed by normal cellulosic aging processes, and (2) by reaction with the hydroxyl groups of the cellulose molecule.

Certain of the foregoing compounds especially those of low molecular weight may be somewhat flammable in the presence of oxygen. In cases where this factor must be considered, the problem may be overcome by (1) using sealed apparatus from which oxygen is excluded, (2) using the additive in conjunction with inert atmospheres, or (3) using the higher molecular weight additive compounds.

The dielectric liquid 4 may contain, in addition to the additives of the invention, other materials for serving various functions. For example, the dielectric liquid may contain, or during operation of the apparatus generate, undesired byproducts or contaminants, and there may be incorporated therein various other additives for overcoming the deleterious effects of such by-products and contaminants. Such other additives may include, for example, anti-oxidants (e.g., dibutyl para cresol) and halogen scavengers (e.g., tin tetraphenyl and epoxide compounds).

The additive compounds employed in accordance with the invention are, in general, soluble in conventional dielectric liquids such as mineral oil and halogenated aromatic compounds. The dissolved additives, accordingly, provide an advantage over drying agents which do not dissolve in the dielectric liquid in that, being in solution, the additives are present in all parts of the dielectric liquid in contact with the cellulosic and other insulating materials, so that moisture evolved from such insulation during operation of the electrical apparatus is immediately taken up and removed by the additive without the delay attendant on circulation of the dielectric liquid to the region of the apparatus where otherwise the solid (undissolved) drying agent might be located.

The amount of the additive compound incorporated in the dielectric liquid is not critical, and it depends upon such factors as the size of the apparatus, the degree of dryness of the parts and components of the apparatus, the amount of thermal uprating desired, the amount of cellulosic insulation, the degree of cyanoethylation of the cellulosic insulation, the operating temperature of the apparatus, and other factors. Usually, an amount of additive in the range of .3–5% by weight of the dielectric liquid would be used, but trace amounts up to 10% by weight and higher may be used where circumstances warrant.

In a series of comparative tests using transformers rated at 5 kva. having cellulosic insulation and mineral oil dielectric liquid, one group of transformers (designated A) had cyanoethylated cellulosic insulation with no drying additive in the dielectric liquid, another group (designated B) had conventional cellulosic insulation (kraft paper) with no drying additive in the dielectric liquid, and the remaining group (designated C) had conventional cellulosic kraft paper insulation and 1.3% by weight of isodecyl orthoformate additive in accordance with the invention. The transformers were subjected to life tests during which they were put in operation for a number of cycles, each cycle consisting of six days in operation and one day off, and they were examined during such cyclic life tests for moisture content of the dielectric liquid and transformer power factor.

FIGURE 3 shows the results of the power factor tests by a graph wherein percent power factor is plotted against the number of cycles of the life test. In the graph, the respective curves are designated by letters corresponding to various transformer groups as described above. The approximately 80 cycles of the test period includes 480 days of operation. As will be seen, the power factor of the transformers with isodecyl orthoformate additive was extremely low and constant in value as compared to the other two groups of transformers.

FIGURE 4 is a graph in which the water content in the dielectric oil, in parts per million, is plotted against the number of cycles in the life test, and the curves A, B and C represent the respective transformer groups as above-described. As will be seen, the water content of the transformer oil containing the isodecyl orthoformate in accordance with the invention was considerably lower than that of the other two groups and remained so throughout the period of the test.

The graph in FIGURE 5 shows data demonstrating the improved thermal uprating of transformer components afforded by the isodecyl orthoformate. In the tests on which these data are based, sealed transformer coils (represented by Curve C) containing kraft paper insulation and mineral oil with .1% water content and 2.5% isodecyl orthoformate additive were tested along with sealed coils having cyanoethylated kraft paper insulation (Curve A) and sealed coils having ordinary kraft paper insulation (Curve B), all having a .1% water content in the dielectric oil. In the test, the coils were aged at 175° C. and 1050 volts until a dissipation factor of 200%, taken as the end of life, was reached for each unit. As will be seen from the graph, in which percent dissipation factor is plotted against the time in days, the life of the sealed coils containing the isodecyl orthoformate of the invention (Curve C) was substantially longer than that of the other two groups in which no drying additive was incorporated.

In other tests, it was found that cellulosic (kraft) insulating paper when placed in a container with mineral oil along with enameled (modified polyvinyl formal) wire, where the oil contained about 5% trimethoxyethoxypropane, and aged, with the container sealed, at 180° C. for one week, had a tensile strength of 8600 pounds per square inch. This was in contrast to a control unit containing untreated kraft paper which under the same aging conditions had a tensile strength of only 1900 p.s.i. at the end of the same period. As understood by those versed in the art, the higher the tensile strength of the cellulosic insulating material, the greater the potential life of the electrical apparatus in which it is used.

In another experiment showing the improvement afforded by tetrabutyl titanate, the average dielectric strength of a pint of mineral oil containing 296 parts per million water was tested and found to be 5.8 kv. To this oil was added about 1.5 ml. tetrabutyl titanate, and this caused clearing of the previously clouded oil within thirty seconds. The average dielectric strength of the mineral oil thus treated was found to be 18.0 kv.

In another test using mineral oil alone to which 296 parts per million water were added and treated for 20 hours at 100° C., the oil was found to have a dielectric strength of about 5 kv. The same oil in which .7% by weight of tetraethoxypropane was dissolved was found under the same conditions to have a dielectric strength of over 25 kv.

In still another test using a capacitor coil formed of interwound aluminum foil and kraft paper insulation, with the coil immersed in mineral oil, it was found that the resistivity of the capacitor unit after aging for two months at 150° C. was maintained at $610 \times 10^9$ ohm-cm. by the addition of tetraethoxypropane, in contrast to a similar capacitor unit without the latter additive which manifested a resistivity of only $94 \times 10^9$ ohm-cm. after the same aging.

In other tests the effect of the additives of the invention particularly on the synthetic resin wire enamel was observed, and they were found to markedly stabilize the wire enamel especially at elevated temperature in the presence of cellulosic insulation. For example, in one test enameled wire members were immersed with kraft paper strips in mineral oil. The mineral oil associated with one set of such samples incorporated 5.2% isodecyl orthoformate, whereas in a control set of samples the additive was omitted. Both sets of units were subjected to aging conditions of 175° C. for varying periods. It was found that the average dielectric strength of the enamel coating of the wire members of the control units dropped to 50% of its initial value of 13 kv. after 4 days. In contrast, the units containing the orthoformate additive required 20 days under the same aging conditions before the average dielectric strength of the wire enamel dropped to 50% of its initial value of 13 kv., thus showing a fivefold increase in life over the units lacking the orthoformate additive.

The improvement afforded by the present invention thus also extends to the enamel insulating coating conventionally employed on wire conductors in electrical apparatus. Since absorbed moisture has an adverse effect on such wire enamels especially under high operating temperatures, the use of the additives in dielectric fluids as described herein will also have the effect of stabilizing and prolonging the useful insulating life of such enamel coatings. While a phenolic modified polyvinyl formal type of wire enamel has been specifically disclosed herein, other types of wire enamels may derive similar benefits in association wtih dielectric fluids containing stabilizing additives as described above. Some examples of such other types of enamel are those made of urea-formaldehyde-epoxy resin, acrylic resin, oleoresinous enamel, terephthalate polyester resin, polyester-polyurethane resin, polyester-epoxy resin, and polyester-polyamide-epoxy resin.

There is thus provided by the invention marked improvement in the operating and life characteristics of electrical apparatus, and, in particular, considerably improved stabilization of cellulosic and resinous insulation of such apparatus against thermal degradation in hermetically sealed electrical apparatus, even under severe operating conditions. Since the additive employed in accordance with the invention achieves such stabilization by continuous in situ removal of moisture including that evolved in operation of the apparatus, it avoids the need for elaborate and cumbersome arrangements heretofore relied on for removing evolved moisture from within the unit. At the same time, the additive is fully effective in an air-tight, sealed container and has none of the harmful effects attendant on the use of other known desiccants under the same conditions. A further benefit of the invention is the higher temperature at which the cellulosic insulation, and consequently the apparatus itself, is enabled to operate, thus making more efficient use of the electrical capacity of the apparatus.

Although the invention has been described mainly in connection with a transformer, it will be evident that its benefits may be realized by its application to other electrical apparatus such as capacitors, reactors, cables, switchgear and the like, wherein deterioration of the dielectric liquid and particularly the thermal degradation of cellulosic insulation due to the presence of moisture is encountered.

It will be further understood that the invention is not limited to the use of liquids as dielectric media in the electrical apparatus, since the additive compounds coming within the scope of the invention may be utilized in combination with gaseous types of dielectric fluids as, for example, nitrogen, sulfurhexafluoride, octafluoropropane, and other known or suitable insulating materials.

While the additives as disclosed are remarkably effective for thermal uprating of electrical apparatus even when used alone, they may be used, if desired, in association with cyanoethylated or other chemically modified cellulosic insulation to supplement and increase the thermal upgrading function served by the latter. The use of the stabilizing additives in accordance with the invention not only makes it simpler to obtain the desired degree of thermal uprating, but also makes it possible to obtain greater degrees of thermal stabilization than by the use of cyanoethylated or other chemically modified cellulose alone.

Accordingly, while the present invention has been described with reference to particular embodiments thereof, it will be understood that numerous modifications may be made by those skilled in the art without actually departing from the scope of the invention. Therefore, the appended claims are intended to cover all such equivalent variations as come within the true spirit and scope of the invention.

What we claim as new and desire to secure by Letters Patent of the United States is:

1. Electrical apparatus comprising, in combination, a container, an electrical device in said container, and fluid insulating electrical means in said container in contact with said electrical device for insulating the same, said fluid insulating means having therein an effective amount of a compound having the following formula:

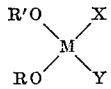

where M is a member selected from the group consisting of C, $CH(CH_2)_m$, Ti and Si, wherein $m$ is a number from 0–14 inclusive, R and R' are members selected from the group consisting of $C_nH_{2n+1}$ and aryl substituted derivatives thereof wherein $n$ is a number from 1–15 inclusive, and $—(CH_2)_n—$ forming a divalent cyclic structure connecting R and R' and wherein $n$ is a number from 2–4 inclusive; and X and Y are members selected from the group consisting of H, alkyl, aryl, OR, and OR', where R and R' are as defined above.

2. Electrical apparatus comprising, in combination, a container, an electrical device in said container, and dielectric liquid in said container in contact with said electrical device for insulating the same, said dielectric liquid containing dissolved therein an effective amount of a compound having the following formula:

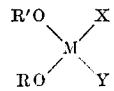

where M is a member selected from the group consisting of C, $CH(CH_2)_mCH$, Ti and Si, wherein $m$ is a number from 0–14 inclusive; R and R' are members selected from the group consisting of $C_nH_{2n+1}$ and aryl substituted derivatives thereof wherein $n$ is a number from 1–15 inclusive, and —$(CH_2)_n$— forming a divalent cyclic structure connecting R and R' and wherein $n$ is a number from 2–4 inclusive, and X and Y are members selected from the group consisting of H, alkyl, aryl, OR, and OR', where R and R' are as defined above.

3. Electrical apparatus comprising, in combination, a container, an electrical device in said container, and a dielectric fluid in said container in contact with said electrical device for insulating the same, said dielectric fluid having therein an effective amount of a compound having the following formula:

where R, R' and R" are alkyl groups having 1 to 12 carbon atoms, inclusive.

4. Electrical apparatus comprising, in combination, a container, an electrical device in said container, and a dielectric liquid in said container in contact with said electrical device for insulating the same, said dielectric liquid having dissolved therein an effective amount of a compound having the following formula:

where R, R' and R" are alkyl groups having 8 to 10 carbon atoms, inclusive.

5. Electrical apparatus comprising, in combination, a container, an electrical device in said container which develops heat during operation of the apparatus, cellulosic electrical insulating material associated with said electrical device, said cellulosic material being subjected to deterioration in the presence of moisture under the temperatures developed and evolving moisture in the process of such deterioration, and fluid insulating means in said container in contact with said electrical device for insulating the same, said fluid insulating means having therein a moisture-removing compound having the following formula:

where M is a member selected from the group consisting of C, $CH(CH_2)_mCH$, Ti and Si, wherein $m$ is a number from 0–14 inclusive; R and R' are members selected from the group consisting of $C_nH_{2n+1}$ and aryl substituted derivatives thereof wherein $n$ is a number from 1–15 inclusive, and —$(CH_2)_n$— forming a divalent cyclic structure connecting R and R' and wherein $n$ is a number from 2–4 inclusive; and X and Y are members selected from the group consisting of H, alkyl, aryl, OR, and OR', where R and R' are as defined above.

6. Electrical apparatus comprising in combination, a container, an electrical device in said container which develops heat during operation of the apparatus, cellulosic electrical insulating material associated with said electrical device, said cellulosic material being subject to deterioration in the presence of moisture under the temperatures developed and evolving moisture in the process of such deterioration, and dielectric liquid in said container in contact with said electrical device for insulating the same, said dielectric liquid containing dissolved therein an effective amount of a compound having the following formula:

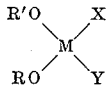

where M is a member selected from the group consisting of C, $CH(CH_2)_mCH$, Ti and Si, wherein $m$ is a number from 0–14 inclusive; R and R' are members selected from the group consisting of $C_nH_{2n+1}$ and aryl substituted derivatives thereof wherein $n$ is a number from 1–15 inclusive, and —$(CH_2)_n$— forming a divalent cyclic structure connecting R and R' and wherein $n$ is a number from 2–4 inclusive; and X and Y are members selected from the group consisting of H, alkyl, aryl, OR, and OR', where R and R' are as defined above.

7. Electrical apparatus comprising, in combination, a container, an electrical device in said container which develops heat during operation, said electrical device comprising a coil formed of a wound conductor, said wound conductor being coated with synthetic resin insulating enamel which is subject to degradation of dielectric properties in the presence of moisture at elevated temperature, cellulosic electrical insulating material associated with said electrical device, said cellulosic material being subject to deterioration in the presence of moisture under the temperatures developed and evolving moisture in the process of such deterioration, a dielectric liquid in said container in contact with said electrical device for insulating the same, said dielectric liquid having dissolved therein an effective amount of a compound having the following formula:

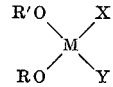

where M is a member selected from the group consisting of C, $CH(CH_2)_mCH$, Ti and Si, wherein $m$ is a number from 0–14 inclusive; R and R' are members selected from the group consisting of $C_nH_{2n+1}$ and aryl substituted derivatives thereof wherein $n$ is a member from 1–15 inclusive, and —$(CH_2)_n$— forming a divalent cyclic structure connecting R and R' and wherein $n$ is a number from 2–4 inclusive; and X and Y are members selected from the group consisting of H, alkyl, aryl, OR, and OR', where R and R' are as defined above.

8. Electrical apparatus comprising, in combination, a container, an electrical device in said container which develops heat during operation of the apparatus, cellulosic electrical insulating material associated with said electrical device, said cellulosic material being subject to deterioration in the presence of moisture under the temperatures developed and evolving moisture in the process of such deterioration, a dielectric liquid in said container in contact with said electrical device for insulating the same and to dissipate heat developed therein, said dielectric liquid having dissolved therein an effective amount of a compound having the following formula:

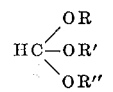

where R, R' and R" are alkyl groups having 8 to 10 carbon atoms, inclusive.

9. Electrical apparatus comprising, in combination, a container, an electrical device in said container, and fluid electrical insulating means in said container in contact with said electrical device for insulating the same, said fluid insulating means containing an effective amount of tri-isodecyl orthoformate.

10. Electrical apparatus comprising, in combination, a container, an electrical device in said container which develops heat during operation of the apparatus, cellulosic electrical insulating material associated with said electrical device, said cellulosic material being subject to deterioration in the presence of moisture under the temperatures developed and evolving moisture in the process of such deterioration, a dielectric liquid in said container in contact with said electrical device for insulating the same and to dissipate heat developed therein, said dielectric liquid containing an effective amount of isodecyl orthoformate for stabilizing the cellulosic insulating material against thermal degradation.

11. An electrical transformer comprising, in combination, a magnetic core, at least one wire wound coil on said core having a plurality of layers each comprising a plurality of wire turns, high temperature resistant adherent resinous film insulation on said wire for electrically insulating adjacent turns from each other, cellulosic electrical insulation material between layers for insulating adjacent layers from each other, said resinous film insulation and said cellulosic insulating material being subject to deterioration in the presence of moisture under elevated operating temperatures, a dielectric liquid in said container in contact with said core and coil for electrically insulating the same and to dissipate heat developed therein, said dielectric liquid containing dissolved therein an effective amount of isodecyl orthoformate.

12. Insulating material for electrical apparatus comprising a dielectric liquid containing dissolved therein from trace amounts to about 10% by weight of a moisture removing compound having the following formula:

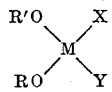

where M is a member selected from the group consisting of C, $CH(CH_2)_mCH$, Ti and Si, wherein $m$ is a number from 0–14 inclusive; R and R' are members selected from the group consisting of $C_nH_{2n+1}$ and aryl substituted derivatives thereof wherein $n$ is a number from 1–15 inclusive, and $—(CH_2)_n—$ forming a divalent cyclic structure connecting R and R' and wherein $n$ is a number from 2–4 inclusive; and X and Y are members selected from the group consisting of H, alkyl, aryl, OR, and OR', where R and R' are as defined above.

13. Insulating material for electrical apparatus comprising a dielectric liquid selected from the group consisting of mineral oil and halogenated aromatic compounds, said dielectric liquid having dissolved therein from trace amounts to about 10% by weight of a moisture removing compound having the following formula:

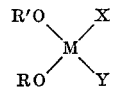

where M is a member selected from the group consisting of C, $CH(CH_2)_mCH$, Ti and Si, wherein $m$ is a number from 0–14 inclusive, R and R' are members selected from the group consisting of $C_nH_{2n+1}$ and aryl substituted derivatives thereof wherein $n$ is a number from 1–15 inclusive, and $—(CH_2)_n—$ forming a divalent cyclic structure connecting R and R' and wherein $n$ is a number from 2–4 inclusive; and X and Y are members selected from the group consisting of H, alkyl, aryl, OR, and OR', where R and R' are as defined above.

14. In an electrical apparatus, an insulating system therefor, comprising, in combination, a dielectric liquid, cellulosic electrical insulating material, and an effective amount of a moisture removing compound contained in said dielectric liquid for stabilizing said cellulosic insulating material against thermal degradation during operation of the electrical apparatus, said moisture removing compound having the following formula:

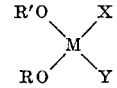

where M is a member selected from the group consisting of C, $CH(CH_2)_mCH$, Ti and Si, wherein $m$ is a number from 0–14 inclusive; R and R' are members selected from the group consisting of $C_nH_{2n+1}$ and aryl substituted derivatives thereof wherein $n$ is a number from 1–15 inclusive, and $—(CH_2)_n—$ forming a divalent cyclic structure connecting R and R' and wherein $n$ is a number from 2–4 inclusive; and X and Y are members selected from the group consisting of H, alkyl, aryl, OR, and OR', where R and R' are as defined above.

15. Electrical apparatus comprising, in combination, a container, an electrical device in said container which develops heat during operation of the apparatus, cyanoethylated cellulosic electrical insulating material associated with said electrical device, and fluid electrical insulating means in said container in contact with said electrical device and said cyanoethylated cellulosic insulating material thereof, said fluid insulating means containing an effective amount of a compound having the following formula:

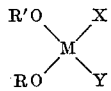

where M is a member selected from the group consisting of C, $CH(CH_2)_mCH$, Ti and Si, wherein $m$ is a number from 0–14 inclusive; R and R' are members selected from the group consisting of $C_nH_{2n+1}$ and aryl substituted derivatives thereof wherein $n$ is a number from 1–15 inclusive, and $—(CH_2)_n—$ forming a divalent cyclic structure connecting R and R' and wherein $n$ is a number from 2–4 inclusive; and X and Y are members selected from the group consisting of H, alkyl, aryl, OR, and OR', where R and R' are as defined above.

16. Electrical apparatus comprising, in combination, a container, an electrical device in said container having elongated conductor means coated with adherent resinous film insulation, cyanoethylated cellulosic electrical insulating material associated with said electrical device, and fluid electrical insulating means in said container in contact with said electrical device and said resinous film insulation thereof and said cyanoethylated cellulosic insulating material, said fluid insulating means containing an effective amount of a compound having the following formula:

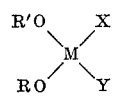

where M is a member selected from the group consisting of C, and $CH(CH_2)_mCH$, Ti and Si, wherein $m$ is a number from 0–14 inclusive; R and R' are members selected from the group consisting of $C_nH_{2n+1}$ and aryl substituted derivatives thereof wherein $n$ is a number from 1–15 inclusive, and $—(CH_2)_n—$ forming a divalent cyclic structure connecting R and R' and wherein $n$ is a number of 2–4 inclusive, and X and Y are members selected from the group consisting of H, alkyl, aryl, OR, and OR', where R and R' are as defined above.

17. Electrical apparatus as defined in claim 5, wherein said compound is 2-ethylhexyl orthoformate.

18. Electrical apparatus as defined in claim 5, wherein said compound is trimethoxyethoxypropane.

19. Electrical apparatus as defined in claim 5, wherein said compound is tetraethoxypropane.

20. Electrical apparatus as defined in claim 5, wherein said compound is tetrabutyl titanate.

References Cited

UNITED STATES PATENTS

| | | | |
|---|---|---|---|
| 2,758,088 | 8/1956 | Bartlett et al. | 252—45 |
| 2,842,432 | 8/1958 | Newman et al. | 44—77 X |
| 2,892,166 | 6/1959 | Sloat et al. | 252—64 |
| 2,897,068 | 7/1959 | Pellegrini et al. | 44—77 |

LEON D. ROSDOL, *Primary Examiner.*

J. D. WELSH, *Assistant Examiner.*

UNITED STATES PATENT OFFICE
CERTIFICATE OF CORRECTION

Patent No. 3,413,404                                    November 26, 1968

Kenneth W. MacFadyen et al.

It is certified that error appears in the above identified patent and that said Letters Patent are hereby corrected as shown below:

Column 4, lines 72 to 75, the right-hand portion of the formula should appear as shown below:

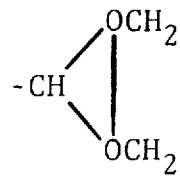

Column 7, line 56, "wtih" should read -- with --. Column 8, line 47, "insulating electrical" should read -- electrical insulating --; line 56, after "$(CH_2)_m$" insert -- CH --. Column 12, line 53, "of" should read -- from --.

Signed and sealed this 10th day of March 1970.

(SEAL)
Attest:

EDWARD M. FLETCHER, JR.                      WILLIAM E. SCHUYLER, JR
Attesting Officer                                 Commissioner of Patents